(12) United States Patent
Somani et al.

(10) Patent No.: US 11,381,171 B2
(45) Date of Patent: Jul. 5, 2022

(54) UNIVERSAL BUCK-BOOST TOPOLOGY AND SWITCHING SEQUENCE

(71) Applicant: Hamilton Sundstrand Corporation, Charlotte, NC (US)

(72) Inventors: Vaibhav Kumar Somani, Bangalore (IN); Raviprakash Yadav, Bengaluru (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 29 days.

(21) Appl. No.: 16/930,866

(22) Filed: Jul. 16, 2020

(65) Prior Publication Data

US 2021/0391797 A1     Dec. 16, 2021

(30) Foreign Application Priority Data

May 11, 2020   (IN) .............................. 202041019854

(51) Int. Cl.
  *H02M 3/158*   (2006.01)
  *G05F 1/46*   (2006.01)
  *H02M 1/00*   (2006.01)

(52) U.S. Cl.
  CPC ............ *H02M 3/1584* (2013.01); *G05F 1/46* (2013.01); *H02M 1/0003* (2021.05); *H02M 1/009* (2021.05); *H02M 3/1582* (2013.01)

(58) Field of Classification Search
  CPC ........................... H02M 3/1582; H02M 3/1584
  USPC ................... 323/282–285; 363/59–60, 63
  See application file for complete search history.

(56) References Cited

U.S. PATENT DOCUMENTS

| | | | |
|---|---|---|---|
| 8,957,644 B2 * | 2/2015 | Mao ........................ | H02J 1/102 323/259 |
| 9,088,211 B2 | 7/2015 | Ivanov et al. | |
| 10,014,777 B1 | 7/2018 | Shumkov et al. | |
| 10,381,953 B2 | 8/2019 | Ho et al. | |
| 2003/0001547 A1 | 1/2003 | Jurzitza | |
| 2004/0239299 A1 * | 12/2004 | Vinciarelli .......... | H02M 3/1582 323/282 |
| 2010/0039080 A1 | 2/2010 | Schoenbauer et al. | |
| 2010/0045255 A1 | 2/2010 | Chojecki et al. | |
| 2010/0164650 A1 * | 7/2010 | Abou-Alfotouh .. | H02M 3/1582 333/181 |
| 2011/0089915 A1 * | 4/2011 | Qiu ........................ | G05F 1/613 323/271 |
| 2012/0126777 A1 | 5/2012 | Motegi | |

(Continued)

OTHER PUBLICATIONS

Extended European Search Report dated Sep. 1, 2021, issued during the prosecution of European Patent Application No. EP 21173417.3.

*Primary Examiner* — Gary A Nash
(74) *Attorney, Agent, or Firm* — Locke Lord LLP; Joshua L. Jones; Scott D. Wofsy

(57) ABSTRACT

A buck-boost power converting system includes a voltage source input for connecting a voltage source for power conversion. A plurality of switches are connected electrically to the voltage source input, wherein each switch is connected to a controller configured for control of the switches. A voltage output is configured to connect to a load to power the load with converted power from the voltage source input, wherein the controller is configured to provide positive voltage or negative voltage at a desired level to the voltage output, as needed.

9 Claims, 3 Drawing Sheets

(56) References Cited

U.S. PATENT DOCUMENTS

| | | | |
|---|---|---|---|
| 2015/0236594 A1* | 8/2015 | Branca | G09G 3/3258 345/213 |
| 2015/0256071 A1* | 9/2015 | Penzo | H05B 45/3725 315/297 |
| 2016/0105110 A1* | 4/2016 | Houston | H02M 3/1582 323/271 |
| 2018/0287498 A1* | 10/2018 | Yu | H02M 3/1584 |

* cited by examiner

| Cycle\Switch | S1 | S2 | S3 | S4 | S5 |
|---|---|---|---|---|---|
| T on | ON | OFF | ON | OFF | OFF |
| T off | OFF | ON | OFF | ON | |

*Fig. 2*

| Cycle\Switch | S1 | S2 | S3 | S4 | S5 |
|---|---|---|---|---|---|
| T on | ON | OFF | ON | OFF | OFF |
| T off | OFF | | ON | | ON |

*Fig. 3*

| Cycle\Switch | S1 | S2 | S3 | S4 | S5 |
|---|---|---|---|---|---|
| T on | ON | OFF | ON | OFF | OFF |
| T off | ON | OFF | OFF | ON | OFF |

*Fig. 4*

| Cycle\Switch | S1 | S2 | S3 | S4 | S5 |
|---|---|---|---|---|---|
| T on | ON | OFF | OFF | ON | OFF |
| T off | OFF | ON | OFF | ON | OFF |

*Fig. 5*

UNIVERSAL BUCK-BOOST TOPOLOGY AND SWITCHING SEQUENCE

CROSS-REFERENCE TO RELATED APPLICATIONS

This application claims priority to Indian Application No. 202041019854 filed May 11, 2020 the entire contents of which are incorporated by reference herein.

BACKGROUND

1. Field

The present disclosure relates to power conversion, and more particularly to buck-boost power supply topologies.

2. Description of Related Art

In a modular power supply, there is a need for power conversion topologies that can be configured to both positive and negative regulated output for varying input voltage ranges. Typically, a four switch, one-inductor buck-boost topology is available for non-inverting output, and a two switch, one inductor buck-boost topology is available for inverting output. But these two aforementioned topologies can only be configured for either positive or negative output polarity with a desired regulated level.

The conventional techniques have been considered satisfactory for their intended purpose. However, there is an ever present need for improved systems and methods for power supply. This disclosure provides a solution for this need.

SUMMARY

A buck-boost power converting system includes a voltage source input for connecting a voltage source for power conversion. A plurality of switches are electrically connected to the voltage source input, wherein each switch is connected to a controller configured for control of the switches. A voltage output is configured to connect to a load to power the load with converted power from the voltage source input, wherein the controller is configured to provide positive voltage or negative voltage to the voltage output, as needed.

A first line can run from a positive node of the voltage source input to a first node of the voltage output. A second line can run from a negative node of the voltage source input to a second node of the voltage output, wherein the voltage output is configured to power a load connected between the first and second nodes of the voltage output. An inductor can be connected in series along the first line. A capacitor can connect between the first and second lines.

The plurality of switches can include a first switch connected in series along the first line between the voltage input and the inductor. A second switch can connect between the first line and the second line, wherein the second switch connects to the first line at a node between the first switch and the inductor. A third switch can connect between the first line and the second line, wherein the third switch connects to the first line at a node between the inductor and the first node of the voltage output. A fourth switch can be connected in series along the first line between the first node of the voltage output and the third switch. A fifth switch can be connected in series along a third line that is in parallel with the first line, wherein the third line connects to the first line at a node between the first switch and the inductor, and at the first node of the voltage output.

The controller can include machine readable instructions for both a non-inverting mode and an inverting mode. The machine readable instructions can be configured to cause the controller in the non-inverting mode to cycle the switches between a first non-inverting state and a second non-inverting state. In the first non-inverting state the first switch is on, the second switch is off, the third switch is on, the fourth switch is off, and the fifth switch is off. In the second non-inverting state the first switch is off, the second switch is on, the third switch is off, the fourth switch is on, and the fifth switch is off. The machine readable instructions can be configured to cause the controller in the inverting mode to cycle the switches between a first inverting state and a second inverting state. In the first inverting state the first switch is on, the second switch is off, the third switch is on, the fourth switch is off, and the fifth switch is off. In the second inverting state the first switch is off, the second switch is off, the third switch is on, the fourth switch is off, and the fifth switch is on.

The controller and switches can be configured for pulse width modulation (PWM) control of the switches from state to state. The voltage source input can have a polarity, wherein in the non-inverting mode, the voltage output has the same polarity as the voltage source input, and wherein in the inverting mode, the voltage output as a polarity opposite that of the voltage source input. The controller can be configured to receive input and to switch between the non-inverting mode and the inverting mode based on the input.

A method includes switching a single buck-boost circuit between an non-inverting mode wherein input voltage polarity is not inverted for output to a load, and an inverting mode wherein input voltage polarity is inverted for output to the load.

The buck-boost circuit can include a first switch, a second switch, a third switch, a fourth switch, and a fifth switch, wherein in each of the non-inverting and inverting modes, the method includes pulse width modulation (PWM) control of the switches. PWM control of the switches can include in the non-inverting mode cycling the switches between a first state and a second state as described above. PWM control of the switches can include in the inverting mode cycling the switches between a first state and a second state as described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIGS. 2-3 are tables showing the switching states for non-inverting and inverting modes for the topology of FIG. 1, respectively;

FIG. 4 is a table showing the switching states for boost mode for the topology of FIG. 1; and FIG. 5 is a table showing the switching states for buck mode for the topology of FIG. 1.

DETAILED DESCRIPTION OF THE PREFERRED EMBODIMENTS

Figure 1:
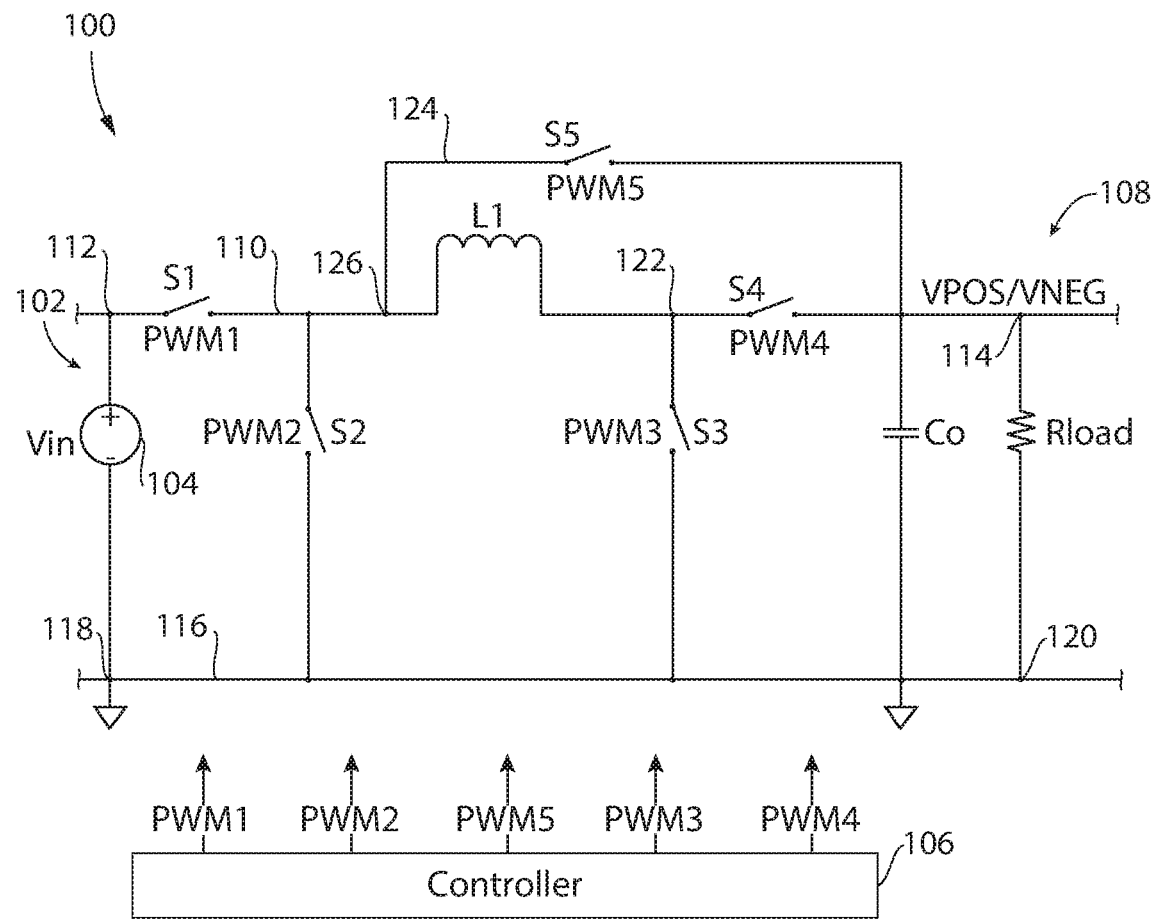
FIG. 1 is a schematic view of an embodiment of a system constructed in accordance with the present disclosure, showing the switch topology.

Reference will now be made to the drawings wherein like reference numerals identify similar structural features or aspects of the subject disclosure. For purposes of explanation and illustration, and not limitation, a partial view of an embodiment of a buck-boost power converting system in accordance with the disclosure is shown in FIG. 1 and is designated generally by reference character 100. Other aspects are shown in FIGS. 2-5. The systems and methods described herein can be used to selectively provide either inverted polarity or non-inverted polarity output voltage as needed.

The buck-boost power converting system 100 includes a voltage source input 102 for connecting a voltage source 104 for power conversion. A plurality of switches S1, S2, S3, S4, S5 are electrically connected to the voltage source input 102, wherein each switch S1, S2, S3, S4, S5 is connected to a controller 106 configured for control of the switches S1, S2, S3, S4, S5. A voltage output 108 is configured to connect to a load $R_{load}$ to power the load $R_{load}$ with converted power from the voltage source input 102. The controller 106 is configured to provide positive voltage or negative voltage to the voltage output 108, as needed.

A first line 110 runs from a positive node 112 of the voltage source input 102 to a first node 114 of the voltage output. A second line 116 runs from a negative node 118 (or ground) of the voltage source input 102 to a second node 120 (or ground) of the voltage output 108. The voltage output 108 is configured to power a load $R_{load}$ connected between the first and second nodes 114, 120 of the voltage output 108. An inductor L1 is connected in series along the first line 110. A capacitor Co connects between the first and second lines 110, 116.

The first switch S1 is connected in series along the first line 110 between the voltage input 102 and first node 126 of the inductor L1. The second switch S2 connects between the first line 110 and the second line 116 (or ground). The second switch S2 connects to the first line 110 at a node 126 between the first switch S1 and the inductor L1. The third switch S3 connects between the first line 110 and the second line 116 (or ground). The third switch S3 connects to the first line 110 at a node 122 between the inductor L1 and the first node 114 of the voltage output. The fourth switch S4 is connected in series along the first line 110 between the first node 114 of the voltage output and a node 122 of the third switch S3. The fifth switch S5 is connected in series along a third line 124 that is in parallel with the first line 110. The third line 124 connects to the first line 110 at a node 126 between the first switch S1 and the inductor L1, and at the first node 114 of the voltage output 108.

The controller 106 includes machine readable instructions for both a non-inverting mode and an inverting mode. The controller 106 and switches S1, S2, S3, S4, S5 are configured for pulse width modulation (PWM) control of the switches S1, S2, S3, S4, S5 from state to state for the inverting and non-inverting modes described below with respect to FIGS. 2-3. The voltage source input 102 has a polarity depending on the polarity of the voltage source 104 connected to the voltage source input 102 (in FIG. 1, the polarity of the voltage source is indicated with the positive and negative signs). In the non-inverting mode shown in FIG. 2, the voltage output 108 has the same polarity as the voltage source input 102. In the inverting mode shown in FIG. 3, the voltage output 108 as a polarity opposite that of the voltage source input 102. The controller 106 is configured to receive input and to switch between the non-inverting mode and the inverting mode based on the input.

With reference now to FIG. 2, the machine readable instructions of the controller 106 are configured to cause the controller 106, in the non-inverting mode, to cycle the switches S1, S2, S3, S4, S5 at PWM frequencies between a first non-inverting state Ton and a second non-inverting state Toff. In the first non-inverting state Ton, the first switch S1 is on (or closed), the second switch S2 is off (or open), the third switch S3 is on, the fourth switch S4 is off, and the fifth switch S5 is off. In the second non-inverting state Toff, the first switch S1 is off, the second switch S2 is on, the third switch S3 is off, the fourth switch S4 is on, and the fifth switch S5 is off.

With reference now to FIG. 3, the machine readable instructions of the controller 106 are configured to cause the controller 106, in the inverting mode, to cycle the switches S1, S2, S3, S4, S5 at PWM frequencies between a first inverting state Ton and a second inverting state Toff. In the first inverting state Ton, the first switch S1 is on, the second switch S2 is off, the third switch S3 is on, the fourth switch S4 is off, and the fifth switch S5 is off. In the second inverting state Toff, the first switch S1 is off, the second switch S2 is off, the third switch S3 is on, the fourth switch S4 is off, and the fifth switch S5 is on. With reference to FIGS. 2-3, the output voltage can be achieved at desired voltage level by operating switches in first state (Ton) and second state (Toff) in a particular duty cycle of total time period.

A method includes switching a single buck-boost circuit (e.g. as shown in FIG. 1) between an non-inverting mode wherein input voltage polarity is not inverted for output to a load (e.g. load $R_{load}$), and an inverting mode wherein input voltage polarity is inverted for output to the load. In this way, the system 100 can provide positive polarity output or negative polarity output as needed without changing the polarity of the voltage source 104.

The system in FIG. 1 is not limited to only buck-bost modes of operation. It can additionally be operated in boost mode or buck mode as needed. The controller 106 can be configured to operate the circuit in boost mode using the switching sequence for switches S1-S5 as shown in FIG. 4. Similarly, the controller 106 can be configured to operate the circuit in buck mode using the switching sequence shown in FIG. 5. In a non-inverting mode, the controller 106 can be configured to operate in any sequence of buck mode, boost mode, and buck-boost mode.

The methods and systems of the present disclosure, as described above and shown in the drawings, provide for a buck-boost topology and switching sequences for inverted or non-inverted polarity output voltage as needed. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A buck-boost power converting system comprising:
a voltage source input for connecting a voltage source for power conversion;

a plurality of switches electrically connected to the voltage source input, wherein each switch is connected to a controller configured for control of the switches; and
a voltage output configured to connect to a load to power the load with converted power from the voltage source input, wherein the controller is configured to provide positive voltage or negative voltage to the voltage output, as needed, further comprising:
   a first line running from a positive node of the voltage source input to a first node of the voltage output; and
   a second line running from a negative node of the voltage source input to a second node of the voltage output, wherein the voltage output is configured to power a load connected between the first and second nodes of the voltage output, further comprising an inductor connected in series along the first line, further comprising a capacitor connecting between the first and second lines, wherein the plurality of switches includes:
   a first switch connected in series along the first line between the voltage input and the inductor;
   a second switch connecting between the first line and the second line, wherein the second switch connects to the first line at a node between the first switch and the inductor;
   a third switch connecting between the first line and the second line, wherein the third switch connects to the first line at a node between the inductor and the first node of the voltage output;
   a fourth switch connected in series along the first line between the first node of the voltage output and the third switch; and
   a fifth switch connected in series along a third line that is in parallel with the first line, wherein the third line connects to the first line at a node between the first switch and the inductor, and at the first node of the voltage output.

2. The system as recited in claim 1, wherein the controller includes machine readable instructions configured to cause the controller in a non-inverting mode to cycle the switches between a first state and a second state,
   wherein in the first state the first switch is on, the second switch is off, the third switch is on, the fourth switch is off, and the fifth switch is off, and
   wherein in the second state the first switch is off, the second switch is on, the third switch is off, the fourth switch is on, and the fifth switch is off.

3. The system as recited in claim 1, wherein the controller includes machine readable instructions configured to cause the controller in an inverting mode to cycle the switches between a first state and a second state,
   wherein in the first state the first switch is on, the second switch is off, the third switch is on, the fourth switch is off, and the fifth switch is off, and
   wherein in the second state the first switch is off, the second switch is off, the third switch is on, the fourth switch is off, and the fifth switch is on.

4. The system as recited in claim 1, wherein the voltage source input has a polarity, wherein in the non-inverting mode, the voltage output has the same polarity as the voltage source input, and wherein in the inverting mode, the voltage output as a polarity opposite that of the voltage source input.

5. The system as recited in claim 4, wherein the controller is configured to receive input and to switch between the non-inverting mode and the inverting mode based on the input.

6. A buck-boost power converting system comprising:
   a voltage source input for connecting a voltage source for power conversion;
   a plurality of switches electrically connected to the voltage source input, wherein each switch is connected to a controller configured for control of the switches; and
   a voltage output configured to connect to a load to power the load with converted power from the voltage source input, wherein the controller is configured to provide positive voltage or negative voltage to the voltage output, as needed, wherein the plurality of switches includes a first switch, a second switch, a third switch, a fourth switch, and a fifth switch,
      wherein the controller includes machine readable instructions for both a non-inverting mode and an inverting mode,
      wherein the machine readable instructions are configured to cause the controller in the non- inverting mode to cycle the switches between a first non-inverting state and a second non-inverting state,
      wherein in the first non-inverting state the first switch is on, the second switch is off, the third switch is on, the fourth switch is off, and the fifth switch is off,
      wherein in the second non-inverting state the first switch is off, the second switch is on, the third switch is off, the fourth switch is on, and the fifth switch is off,
      wherein the machine readable instructions are configured to cause the controller in the inverting mode to cycle the switches between a first inverting state and a second inverting state,
      wherein in the first inverting state the first switch is on, the second switch is off, the third switch is on, the fourth switch is off, and the fifth switch is off, and
      wherein in the second inverting state the first switch is off, the second switch is off, the third switch is on, the fourth switch is off, and the fifth switch is on.

7. The system as recited in claim 6, wherein the controller and switches are configured for pulse width modulation (PWM) control of the switches from state to state.

8. A method comprising:
   switching a single buck-boost circuit between an non-inverting mode wherein input voltage polarity is not inverted for output to a load, and an inverting mode wherein input voltage polarity is inverted for output to the load, wherein the buck-boost circuit includes a first switch, a second switch, a third switch, a fourth switch, and a fifth switch, wherein in each of the non-inverting and inverting modes, the method includes pulse width modulation (PWM) control of the switches, wherein PWM control of the switches includes in the non-inverting mode cycling the switches between a first state and a second state,
      wherein in the first state the first switch is on, the second switch is off, the third switch is on, the fourth switch is off, and the fifth switch is off, and
      wherein in the second state the first switch is off, the second switch is on, the third switch is off, the fourth switch is on, and the fifth switch is off.

9. A method comprising:
   switching a single buck-boost circuit between an non-inverting mode wherein input voltage polarity is not inverted for output to a load, and an inverting mode wherein input voltage polarity is inverted for output to the load, wherein the buck-boost circuit includes a first switch, a second switch, a third switch, a fourth switch, and a fifth switch, wherein in each of the non- inverting and inverting modes, the method includes pulse width modulation (PWM) control of the switches, wherein PWM control of the switches includes in the inverting mode cycling the switches between a first state and a second state, wherein in the first state the first switch is on, the second switch is off, the third switch is on, the fourth switch is off, and the fifth switch is off, and wherein in the second state the first switch is off, the second switch is off, the third switch is on, the fourth switch is off, and the fifth switch is on.

* * * * *